Patented Sept. 25, 1945

2,385,384

UNITED STATES PATENT OFFICE 2,385,384

HEAT-TREATED ASBESTOS FILLED MOLDING COMPOSITION

Paul C. Schroy, Stamford, Conn., assignor to American Cyanamid Company, New York, N. Y., a corporation of Maine No Drawing. Application August 5, 1941, Serial No. 405,538

10 Claims. (Cl. 260—38)

This invention relates to thermosetting resin molding compositions having a high heat resistance and good dielectric strength together with high arc resistance and other desirable physical and chemical properties.

It has been customary to add fibrous fillers to thermosetting resins in order to produce molding compositions which upon being subjected to heat and pressure produce moldings having a satisfactory mechanical strength. For most ordinary purposes, the cellulosic fibers have been used for this purpose. However in those applications where the molded articles are to be subjected to high temperature the cellulosic fibers cannot be employed. To solve this problem mineral fillers such as asbestos fibers have been used since such fibers have extremely high heat resistance. Asbestos filled moldings have previously not had the high dielectric strength and arc resistance characteristic of similar compositions containing cellulosic fillers. Many attempts have been made to provide molding compositions which would have both heat resistance and good electrical properties. These attempts have not been entirely successful.

An object of my invention is to produce molded articles which have not only high heat resistance but also good electrical properties, good chemical properties and satisfactory mechanical strength.

Another object of my invention is to provide molded articles the dielectric strength of which decreases very little with rising temperatures.

Still another object of my invention is to provide molding compositions which have low mold shrinkage, good flow properties and which also provide moldings having the properties mentioned in the foregoing objects.

A particular object of my invention is to provide molding compositions containing melamine-formaldehyde resins having the aforementioned desirable properties.

These and other objects are attained by heating asbestos fiber at a temperature of about 900° F. to about 1400° F. but preferably at around 1200° F. and employing the asbestos fiber thus treated as a filler for a thermosetting condensation product which may be polymerized under alkaline conditions to the substantially infusible and substantially insoluble form.

The following examples in which the proportions are in parts by weight are given by way of illustration and not in limitation.

Example 1

| | Parts |
|---|---|
| Melamine-formaldehyde resin (resin "A") | 30 |
| Asbestos fiber | 70 |
| Zinc stearate | 1–2 |

The asbestos fiber is heated for about 60 minutes at about 1200° F., cooled and mixed with the melamine resin, preferably in a light mixer in order that the fibers may not be broken up. If the fibers are broken up the impact strength of the moldings will be lower than if the long fibers be preserved. Thus, the mixing may be done in a ribbon blender, a double armed mixer or in any other suitable mixer but preferably one which does not involve a grinding operation. The zinc stearate mold lubricant is preferably mixed with the melamine-formaldehyde resin prior to the addition of the asbestos fibers but it may also be added at any time. The blend is rolled on hot differential compounding rolls at 100–115° C. for from about 1 to 1½ minutes, or longer if desired, and the sheets cooled and ground to suitable size, e. g., all through about an 8 mesh screen.

The molding powder prepared above may be molded at about 155° C. under pressures of about 500–4000 pounds per square inch for from 3 to 10 minutes, thereby producing materials having a dielectric strength of about 300 volts per mil at 100° C. Such moldings do not check or crack upon heating for 8 hours at 400° F. and they have excellent water resistance. My products show a very low mold shrinkage and also a low shrinkage after removal from the mold. Similar moldings prepared from untreated asbestos have a dielectric strength of only about 50 volts per mil at 100° C.

If the asbestos fiber be heated for about 15 minutes instead of for about 1 hour as above, the resulting products have a dielectric strength at 100° C. of about 282 volts per mil and if the asbestos fiber be heated for 30 minutes the dielectric strength is about 325 volts per mil.

Example 2

| | Parts |
|---|---|
| Melamine-formaldehyde resin (resin "A") | 40 |
| Asbestos fiber | 60 |
| Zinc stearate | 1 |
| Benzoyl phthalimide | 0.1 |

The asbestos fiber is heated at about 1000° F. for about 30 minutes. The fiber is cooled and blended with the melamine-formaldehyde resin and zinc stearate as described in Example 1.

The molding powder produced according to this example when molded at about 155° C. and under pressure of about 500 to 2500 pounds per square inch for several minutes results in products having a dielectric strength of about 180 volts per mil at 100° C.

Example 3

| | Parts |
|---|---|
| Melamine-Formaldehyde resin (resin "A") | 35 |
| Asbestos fiber | 65 |
| Zinc stearate | 1 |

The asbestos fiber is heated for from about 15 minutes to 60 minutes at 1400° F. The asbestos fiber is cooled and blended with the resin and zinc stearate as before.

Molded products made from the molding powder prepared according to this example have most of the desirable properties of products produced according to Examples 1 and 2. If the asbestos be heated for about 30 minutes the dielectric strength at 100° C. will be about 190 volts per mil whereas if the fiber be heated for about 60 minutes the dielectric strength will be about 178 volts per mil, and if the fiber be heated for only about 15 minutes the dielectric strength will be about 250 volts per mil. The dielectric strength in each instance is determined by the A. S. T. M. method: D149–40T.

Products prepared according to this invention using a melamine-formaldehyde resin binder have an arc resistance of about 190 seconds as compared to only about 140 seconds when untreated fibers be used. The arc resistance is determined by A. S. T. M. method: D495–38T. The high arc resistance may be attributable not only to the heat-treated asbestos but also to the melamine resin binder.

*Example 4*

| | Parts |
|---|---|
| Phenol formaldehyde (resin "C") | 132 |
| Asbestos fiber | 268 |
| Zinc stearate | 6 |
| Hexamethylene tetramine | 60 |

The asbestos fiber is heated for about 30 minutes at around 1200° F., cooled and mixed with the other substances. The zinc stearate or other mold lubricant is blended with the resin and asbestos fiber in any suitable manner as in a ribbon blender or in a ball mill. The blended mixture thus obtained is compounded for about 3 minutes on differential rolls heated to about 100° C.–110° C. The sheeted material is taken from the rolls, ground in a hammer mill or other suitable apparatus thereby producing a molding composition which may be molded into desired shapes under heat and pressure in the same general manner as described in Example 1. Moldings of this composition have a dielectric strength of about 384 volts per mil at room temperature. On the other hand, moldings produced in the same manner utilizing untreated asbestos fiber have a dielectric strength of only 260 volts per mil at room temperature. Thus a marked improvement is obtained when the heat-treated asbestos is used even with a phenol-formaldehyde resin of the two-stage type.

The asbestos used in the preceding experiments is of the "chrysotile" variety but other types of asbestos may be used.

The dielectric strength of molded products rises rapidly from about 50 volts per mil at 100° C. when the fiber is heated at around 400–800° F. to about 300 volts per mil and it drops off rather rapidly when the fiber is heated above 1200° F. Accordingly my invention contemplates the use of fiber heated between the two approximate temperature limits on each side of the optimum temperature, i. e., about 900° F. and 1400° F. The optimum dielectric strength appears at about 1200° F. and therefore temperatures in this neighborhood are preferred. The heating may be carried out for from about 10 minutes to about 1 hour or more. As indicated in Example 1, the best results are obtained when the fiber is heated for about 30 minutes at 1200° F. whereas at higher temperatures such as at 1400° F. as in Example 3, the optimum dielectric strength is obtained when the fiber is heated for only about 15 minutes. At lower temperatures such as at about 1000° F. the heating should be carried out for a longer period of time than at the higher temperature in order to obtain about the same dielectric strength. Accordingly, at temperatures of about 1000° F. the heating is preferably carried out for about ½–1 hour. It is advantageous to use temperatures in the neighborhood of 1200° F. where the temperature and time need not be controlled very accurately inasmuch as reproducible results are more easily obtained in that way. The dielectric strength at room temperature also is improved by heating at temperatures beginning at about 600° F. The heating temperature is that of an exteriorly heated rotary kiln measured by means of a thermocouple enclosed in a metal tube, inserted inside the kiln. The optimum temperature will vary somewhat according to the method of measurement and the type of heater. Thus, if the heating be in a muffle furnace the optimum temperature will be at about 1000° F.

Asbestos fibers have previously been heated in an attempt to improve the properties thereof. However, asbestos fibers break up if they are heated at too high a temperature and therefore the mechanical strength of a molding produced therefrom does not have satisfactory mechanical strength. On the other hand, if the asbestos fiber is not heated to a high enough temperature, the electrical properties are not improved sufficiently to justify this procedure. I have found that moldings produced in accordance with my invention have substantially the same mechanical strength (particularly impact strength) as similar moldings containing untreated asbestos fiber. This is very surprising, in view of the results previously obtained by others in this field, since my products also have greatly improved electrical properties, in addition to the fact that they retain their mechanical strength.

The asbestos fibers are preferably not treated with acid since molded products so treated have somewhat lower impact strength than is obtained if the product be only heat-treated. However, for some purposes the combination of acid treatment and heat treatment may be used, particularly if the impact strength is not important.

The heating of the asbestos fibers appears to increase the alkalinity thereof and the molding compositions have a longer period of flow than similar compositions containing untreated asbestos fiber. In order to vary the flow period, suitable curing catalysts may be incorporated including those which are either alkaline or basic or which produce alkaline or basic materials at the molding temperatures. An example of another type of curing catalyst which I have found to be particularly suitable for modifying the curing process is benzoyl phthalimide.

The melamine-formaldehyde resins suitable for use according to my invention are preferably those prepared from two to three mols of formaldehyde per mol of melamine. While the melamine-formaldehyde resins may be in the form of solutions which are applied to the fibers and then dried, I prefer to employ dry powdery materials and especially those which have been partially polymerized beyond the methylol compound stage.

*Preparation of resin "A"*

| | Parts |
|---|---|
| Melamine (1 mol) | 126 |
| Formalin (2 mols) (37% formaldehyde in water) | 162 |

The pH of the mixture of these substances is adjusted to 6.8 as determined with bromthymol blue indicator (0.04%) in conjunction with a Hellige color disk, bromthymol blue D (No. 170–D). The mixture is heated up to boiling i. e., about 96° C., over about one-half hour. The temperature is then allowed to drop immediately to 75° C. and maintained at this temperature until the solution shows a slight precipitate when diluted with water. After this time, the syrup is adjusted to a pH of about 8.6. If the syrup contains any insoluble impurities it may be filtered to remove such impurities, thereby producing a clear resin syrup. The syrup is now concentrated by heating under a vacuum of about 9–10 inches of mercury absolute pressure, the vacuum being maintained at such a point that the temperature of the resinous syrup will be high enough to keep it fluid, i. e., above the melting point thereof. This temperature will vary from about 50° C. to a temperature slightly above 100° C., e. g., 105–115° C. as water is removed. When the resinous syrup has been substantially dehydrated and polymerized to the desired viscosity, it is removed from the concentrating kettle and cooled to produce a substantially clear, solid resin which is ground to a fine white powder.

One example of a suitable resin which may be substituted for part or all of resin "A" used in the above examples may be prepared as follows. Resin "A" gives a lower after-shrinkage and a longer flow-period than resin "B."

*Preparation of resin "B"*

| | Parts |
|---|---|
| Melamine (1 mol) | 126 |
| Formalin (3 mols) (37% formaldehyde in water) | 243 |

The pH of the mixture of these substances is adjusted to 6.3 as determined with bromthymol blue indicator (0.04%) in conjunction with a Hellige color disk, bromthymol blue D (No. 170–D). The mixture is heated up to about 80° C. over about one-half hour. The temperature is then allowed to drop to about 60° C., requiring about 10 minutes, and it is maintained at that temperature for one-half hour measured from the time that the mixture originally attained 60° C. After this time, the syrup is adjusted to a pH of about 8–8.5. The syrup may be filtered to remove insoluble impurities if any be present, thereby producing a clear, hydrophilic resin syrup. The syrup is now concentrated by heating under a vacuum of about 9–10 inches of mercury absolute pressure, the vacuum being maintained at such a point that the temperature of the resinous syrup will be high enough to keep it fluid, i. e., above the melting point thereof. This temperature will vary from about 50° C. to a temperature slightly above 100° C., e. g. 105–115° C. as water is removed. When the resinous syrup has been substantially dehydrated and the desired viscosity obtained, it is removed from the concentrating kettle and cooled to produce a substantially clear, solid resin which is ground to a fine white powder. The powder may be dissolved in aqueous media containing various proportions of water-miscible alcohols, e. g., ethanol, and used to impregnate heat-treated asbestos to produce a molding composition.

*Preparation of phenol-formaldehyde resin "C"*

| | Parts |
|---|---|
| Phenol | 21.3 |
| Formalin (37% formaldehyde in water) | 17 |
| Concentrated sulfuric acid | 0.4 |
| Water | 3.4 |

The $H_2SO_4$ is mixed with the water and the resulting solution added to the other substances which are placed in a suitable reaction chamber provided with a reflux condenser and heated gradually to 96–100° C. during which time an exothermic reaction takes place which assists in the heating process. After the mixture is thus heated, it is refluxed for about 1 hour (at approximately 98° C.) and then the water is removed by heating under a vacuum of 9–15 inches of mercury absolute pressure until the product is substantially dehydrated. The dehydrated resin is cast and cooled to form a hard brittle product which may be ground to a fine powder, e. g. about 100 mesh.

While my invention is particularly directed to the use of melamine-formaldehyde resins, I have also found that improved products are produced if my heat-treated asbestos is used as a filler with other resinous products. Thus any resin which may be cured (i. e. polymerized to the substantially infusible, substantially insoluble stage) under alkaline conditions may be employed as the bonding material for the heat-treated asbestos. Moldings of such compositions show improved electrical properties particularly dielectric strength as compared to corresponding products in which ordinary untreated asbestos fibers are used. For some purposes melamine resins may be modified with one or more of the following: dicyandiamide, the phenols, (phenol itself, the cresols, etc.), aniline, mono-, di- and triphenyl melamine and such proportions of urea and thiourea as will not affect the ability of the resin to cure under alkaline conditions. Other resins which may be employed are aldehyde condensation products of aminotriazines (including mono-, di- or tri-phenyl melamine, the guanamines, etc.), phenol, the cresols, dicyandiamide, the products obtained upon heating dicyandiamide alone or with substances such as phenol, aniline, etc., mixtures thereof, etc. Mixed condensation products may be prepared by simultaneously reacting an aldehyde with a plurality of the afore-mentioned materials or by adding condensation products of one or more of these materials which are prepared by reacting the aldehyde therewith individually.

Although I prefer to use formaldehyde in preparing condensation products for use with my heat treated asbestos, other aldehydes may be used, e. g. formaldehyde polymers of formaldehyde, acetaldehyde, crotonaldehyde, heptaldehyde, benzaldehyde, cinnamyl aldehyde, etc.

The heat treated asbestos fibers used according to my invention may be employed not only in the form of separate fibers but also in fabricated form, i. e., in the form of threads, tape, felt, woven cloth, etc. If the asbestos fiber be used in the form of paper-like sheets or woven cloth, laminated materials may be produced following the general principles outlined herein and modified appropriately in the ways well known in the art.

Other fibers may be employed in conjunction with my heat-treated asbestos fibers but here again it will generally be desirable to use only the heat-treated asbestos fiber if the ultimate products are to meet rigid specifications pertaining to dielectric strength, heat resistance, etc. Other mineral fibers such as glass fibers as such or in fabricated form may be used. Furthermore, materials such as mica may sometimes advantageously replace part of the asbestos used according to my invention. In some applications part of the asbestos fiber may be replaced by the conventional type of fillers such as cellulose pulp.

Molded products made according to my invention are especially suitable for use in the manufacture of airplane parts, automobile parts, armament parts, as well as for wide application in the electrical industry in switches, motors, etc.

Obviously many modifications and variations in the processes and compositions described above may be made without departing from the spirit and scope of the invention as defined in the appended claims.

I claim:

1. A composition comprising a thermosetting condensation product which may be polymerized to the substantially infusible and insoluble stage under alkaline conditions and asbestos fiber which has been heat-treated before mixing with the condensation product at a temperature between about 900° F. and about 1400° F.

2. A molding composition comprising a melamine-formaldehyde condensation product and asbestos fiber which has been heat-treated at a temperature between about 900° F. and about 1400° F.

3. A molding composition comprising a melamine-formaldehyde condensation product and asbestos fiber which has been heat-treated at around 1200° F.

4. A molding composition comprising a phenol-formaldehyde condensation product and asbestos fiber which has been heat-treated at a temperature between about 900° F. and about 1400° F.

5. A process of producing a molding composition comprising heating asbestos fiber between about 900° F. and about 1400° F., cooling the fiber and blending it with a thermosetting condensation product which may be polymerized to the substantially infusible and insoluble stage under alkaline conditions.

6. A process of producing a molding composition comprising heating asbestos between about 900° F. and about 1400° F., cooling the fiber and mixing it with a melamine-formaldhyde condensation product.

7. A heat and pressure consolidated article including asbestos which has been heat-treated at a temperature between about 900° F. and about 1400° F. bound together with a thermosetting condensation product which may be polymerized to the substantially infusible and insoluble stage under alkaline conditions.

8. A heat and pressure consolidated article including a melamine-formaldehyde resin and asbestos which has been heat-treated at a temperature between about 900° F. and about 1400° F.

9. A heat and pressure consolidated article including a melamine-formaldehyde resin wherein the molal ratio of formaldehyde to melamine is about 2:1 and asbestos which has been heat-treated at around 1200° F.

10. A heat and pressure consolidated article including a phenol-formaldehyde resin and asbestos which has been heat-treated at a temperature between about 900° F. and about 1400° F.

PAUL C. SCHROY.